United States Patent [19]

O'Connor

[11] Patent Number: 4,622,050
[45] Date of Patent: Nov. 11, 1986

[54] AIR INLET FILTER FOR GAS TURBINE ENGINE

[75] Inventor: William O'Connor, Westport, Conn.

[73] Assignee: Avco Corporation, Stratford, Conn.

[21] Appl. No.: 757,332

[22] Filed: Jul. 22, 1985

[51] Int. Cl.$^4$ .............................................. B01D 46/04
[52] U.S. Cl. ....................................... 55/283; 55/290; 55/302; 55/385 B
[58] Field of Search ............. 55/283, 290, 302, 385 B, 55/400, 521

[56] References Cited

U.S. PATENT DOCUMENTS

| | | | |
|---|---|---|---|
| 1,002,618 | 9/1911 | Winkler | 55/290 |
| 1,043,551 | 11/1912 | Thurman | 55/290 |
| 1,493,789 | 5/1924 | Mullen | 55/290 |
| 1,649,220 | 11/1927 | Goodloe | 55/290 |
| 2,795,291 | 6/1957 | Pierce | 55/290 |
| 2,823,656 | 2/1958 | Dolza | 55/302 X |
| 3,104,962 | 9/1963 | Duer | 55/302 |
| 3,360,907 | 1/1968 | Clark, Jr. et al. | 55/283 |
| 4,009,001 | 2/1977 | Reid et al. | |
| 4,294,596 | 10/1981 | Taverez | 55/290 X |
| 4,482,365 | 11/1984 | Roach | 55/283 X |
| 4,514,193 | 4/1985 | Booth | 55/290 |

FOREIGN PATENT DOCUMENTS 611283 10/1960 Italy ...................................... 55/290

Primary Examiner—Robert Spitzer
Attorney, Agent, or Firm—M. E. Frederick

[57] ABSTRACT

An annular air filter is rotationally mounted within a plenum box, which in turn is securely mounted to the inlet end of a gas turbine engine. At least a portion of the annular air filter surrounds the inlet end of the engine. A motor is provided to rotationally drive the air filter relative to both the plenum box and the engine. An air pressure nozzle is disposed adjacent the inner circumferential surface of the air filter, and a vacuum nozzle is disposed adjacent the outer circumferential surface thereof. The air pressure and vacuum nozzles clean the air filter as the air filter is rotated relative thereto.

11 Claims, 5 Drawing Figures

AIR INLET FILTER FOR GAS TURBINE ENGINE

BACKGROUND OF THE INVENTION

Gas turbine engines are used frequently in ground vehicles, and particularly in military vehicles, such as armored tanks and armored personnel carriers. Vehicles of this type frequently will be used in rugged terrain and under a variety of adverse environmental and climatic conditions. For example, the vehicles are likely to place a substantial amount of dust and debris in the surrounding air. These dust and dirt particles could cause significant damage to the rotors of the compressor and turbine. Consequently it is necessary to thoroughly filter the air being drawn into the gas turbine engine. It also is necessary to periodically clean the filters to ensure a sufficient flow of air into the gas turbine engine.

The typical prior art inlet filter system for gas turbine engines on land vehicles has included a generally planar filter mounted in a plenum chamber disposed adjacent the engine. Air is drawn into the plenum chamber and must pass through the filter prior to entering the gas turbine engine. Periodically the filter must be cleaned or replaced. The cleaning procedure may vary depending upon the physical characteristics of the filter medium. For example, some filters must be removed and agitated to shake dust particles free of the filter medium. Other filters utilize a fluid such as water or compressed air to blow trapped particles from the filter. Still other filters utilize a vacuum or a combination of a blower and a vacuum. Many of the prior art filters utilize a blower apparatus and/or a vacuum apparatus which are movable relative to the filter. These blower/vacuum structures will periodically be activated to move across the filter surface to carry out a cleaning operation. Still other inlet filters will employ a plurality of planar filters angularly mounted relative to one another, such as in the form of a letter "V" or "W."

The prior art air inlet filters for gas turbine engines in ground vehicles have had several significant deficiencies. The most significant of these deficiencies has been the large amount of space required for the filter structure. This excessive space is a particular problem in military vehicles such as tanks and armored personnel carriers where space is at a premium. Specifically, the excessive space allotted to a large air inlet filter could otherwise be devoted to military personnel, ammunition, electronic equipment and the like.

The prior art structures and methods for cleaning air inlet filters also have been deficient. Specifically, systems requiring complete replacement of the filter or manual cleaning thereof are inconvenient in most environments and totally unacceptable under combat conditions. Systems that utilize movable sources of air pressure or vacuum to clean the filter overcome certain of the problems associated with manual cleaning or replacement. However, it has been found difficult to achieve a high degree of reliability on the complex movable sources of air pressure or vacuum. Furthermore, these movable sources of air pressure or vacuum are extremely complex and costly and can add significantly to the already excessive space requirements of the inlet filter system.

Accordingly, it is an object of the subject invention to provide an improved air inlet filter for gas turbine engines employed in ground vehicles.

It is another object of the subject invention to provide an air inlet filter for a gas turbine engine that substantially reduces the space requirements of the combined engine and filter system.

It is an additional object of the subject invention to provide an air inlet filter for a gas turbine engine with an efficient filter cleaning mechanism.

It is a further object of the subject invention to provide an air inlet filter for a gas turbine engine with a stationary filter cleaner.

It is still another object of the subject invention to provide an air inlet filter that does not add significantly to the axial length of the gas turbine engine to which it is connected.

Another object of the subject invention is to provide an air inlet filter and turbine engine with no ducting therebetween.

A further object of the subject invention is to provide air inlet filter assembly that enables cleaning of the filter without interrupting the operation of the engine or the vehicle in which the engine is mounted.

SUMMARY OF THE INVENTION

The air inlet filter of the subject invention is a generally annular structure that is mounted adjacent the inlet end of the gas turbine engine. Preferably the annular air filter is of greater diameter than the engine to enable at least a portion of the annular filter to be mounted in a generally telescoping relationship to the turbine engine. The air filter can be either concentrically mounted relative to the center line of the engine or excentrically mounted, depending upon the configuration of the available space in the engine compartment of the vehicle. The filter can be formed from any of a variety of materials, but preferably is formed from a pleated paper that will permit air to pass readily therethrough but will trap dust particles on its surface.

The annular air filter described above is mounted in a plenum box which in turn is structurally mounted to the inlet end of the engine. The mounting of the plenum box to the engine is air tight to prevent ingestion of sand laden air into the system. This air tight mounting can be accomplished by a stationary seal or gasket that is well known in the art. The plenum box is in communication with one or more air inlets. Preferably the air approaching the plenum box passes first through an inertial separator that is designed to remove the larger heavier dirt or dust particles. For example, the inertial separator may include a plurality of apertures each of which is formed to create a vortex or cyclone which causes the dust and dirt particles to be cast off tangentially to the swirling air. These separated dust or dirt particles can be removed by an appropriate arrangement of vibrations, suction, forced air or the like.

The disposition of the air inlet and the air filter in the plenum box are such that all incoming air must pass through the annular air filter to enter the engine. This can be accomplished by a plurality of seals and bearings disposed intermediate the annular air filter and the plenum box walls. For example, flexible seals may be mounted to either the air filter or the plenum box such that the pressure differential across the air filter will keep the seal in a securely closed condition. These seals may be annular in configuration and disposed at one or both axial ends of the annular air filter. Alternatively the axial end of the annular air filter most distant from the engine can be closed by a circular plate which prevents an axial bypassing flow of air into the engine. With this construction the flexible seal need only be disposed adjacent the axial end of the air filter that is telescopingly disposed over the engine.

The cleaning of the air filter is accomplished with a stationary blower disposed radially inwardly to the annular air filter and a stationary vacuum disposed radially outwardly from the air filter. The blower and vacuum are approximately radially in line with one another. Thus, the blower will loosen the dirt and lift the dirt off the outer surface of the filter material. The vacuum then will remove this loosened dirt from the plenum box.

The entire filter is exposed to the stationary cleaning members by rotating the annular filter about its axis. Thus, each complete rotation of the annular filter will cause the entire filter to pass between the stationary blower and vacuum combination. This particular construction completely avoids the complex and troublesome prior art structures which rely on moving sources of air pressure and/or vacuum. Instead, this arrangement uses the simple rotation of an annular filter structure.

The rotation of the annular air filter can be carried out by a motor disposed at least partly in the plenum box and in proximity to the filter. For example, the motor can be mounted outside the plenum box but with a driving member extending through the wall of the plenum box and into proximity with the annular filter. The driving of the filter can be carried out through interengaged gears, belts or the like. As an alternative to the motor, the air filter can be constructed with vanes that will cause the air filter to rotate in response to a pressurized flow of air. The driving and cleaning of the filter is independent of the operation of the engine and thus does not affect the operation of the engine or the vehicle.

To enable the proper mounting and the rotation of the annular air filter relative to the engine, bearings are mounted at each axial end of the air filter. These bearings can be annular in shape and should permit both structural support for the air filter and relative rotation between the filter and the plenum box.

The inlet filter can be constructed to rotate and clean continuously or at preselected time intervals. Preferably, however, a pressure sensing means is mounted adjacent to the inlet of the engine and within the enclosure defined by the air filter and the respective seals. This pressure sensing means will be electrically or pneumatically in communication with the motor, the blower, and the vacuum. As the filter becomes progressively more dirty, the pressure sensed by the pressure sensing means will decrease. At a preselected pressure level, the pressure sensing means will initiate the rotation of the air filter and the activation of both the blower and vacuum. This cleaning will be carried out for at least one rotation of the air filter.

During the cleaning there may be a relatively large amount of dust and dirt particles in the space between the outer circumferential surface of the air filter and the walls of the plenum box. Additionally, the vacuum source may cause localized low pressure areas adjacent the flexible seal between the air filter and the plenum box walls. To insure that none of the circulating debris bypasses the filter to enter the engine at the seal, an array of air pressure nozzles can be disposed in line with the seal to direct an outward flow of air between the axial end of the air filter and the plenum box wall. Although this outward flow of air will ensure that the seal will open, it also will prevent any radially inwardly movement of the debris. Furthermore this opening of the seal will prevent damage to the seal caused by friction between the rotating and non-rotating parts. Consequently the seal will last for a relatively long time.

DETAILED DESCRIPTION OF THE PREFERRED EMBODIMENT

Figure 1:
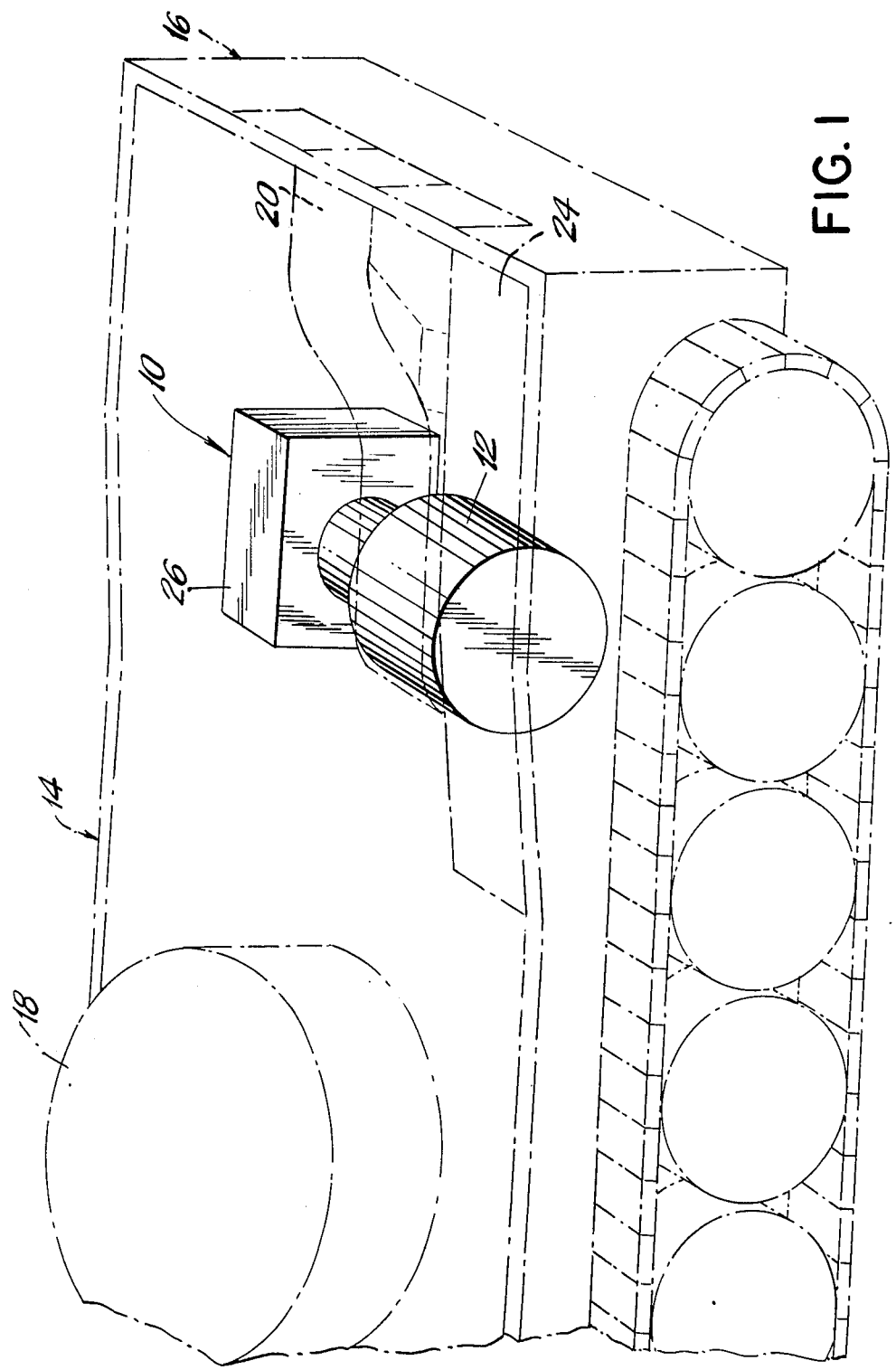
FIG. 1 is a perspective view schematically showing the inlet air filter of the subject invention mounted to a turbine engine of a ground vehicle.

The air inlet filter assembly of the subject invention, is indicated generally by the numeral 10 in FIG. 1 and is adapted for mounting to a gas turbine engine 12 of a land vehicle such as an armored tank 14. The turbine engine 12 and air filter 10 are located in the rear 16 of tank 14. Forward of the engine 12 and air inlet filter assembly 10 is the turret 18, below which is the compartment for one or more operators of the tank 14. Adjacent to the turbine engine 12, and shown in dashed lines, is a duct 20 for exhaust gases. The fuel tank 24 also may be located in the rear 16 of the tank 14 and generally adjacent to turbine engine 12. Although not shown, an inertial separator may be disposed adjacent to and above the turbine engine 12. The inertial separator includes a plurality of apertures configured to create cyclones for separating out the larger debris that otherwise would be drawn in with the air. Generally the inertial separator will remove approximately 80% of the dust and dirt that is in the air drawn into the vehicle.

As illustrated in FIG. 1, the rotational axis of the turbine engine 12 is aligned transversly to the longitudinal axis of the tank 14. The air inlet filter assembly 10 is disposed adjacent and partially surrounding the inlet end of the turbine engine 12. In prior art engines, the longitudinal axis of the turbine had been aligned generally along the longitudinal axis of the vehicle. In that prior art embodiment (not shown) the turbine engine extended into the unoccupied area identified by the numeral 26 in FIG. 1. The prior art tank included a larger air inlet filter, arrangement spaced radially away from the turbine engine. A complicated arrangement of ducts then directed the filtered air from the air inlet filter to the inlet of the prior art turbine engine. This prior art construction resulted in substantially total occupation of the portion of the tank 14 rearward of the turret 18. The unique construction of turbine engine 12 and air inlet filter assembly 10, as illustrated schematically in FIG. 1 and explained in greater detail below results in a substantial space savings, particularly in location 26. Consequently location 26 can be devoted to the storage of ammunition, electronic equipment and such.

Figure 2:
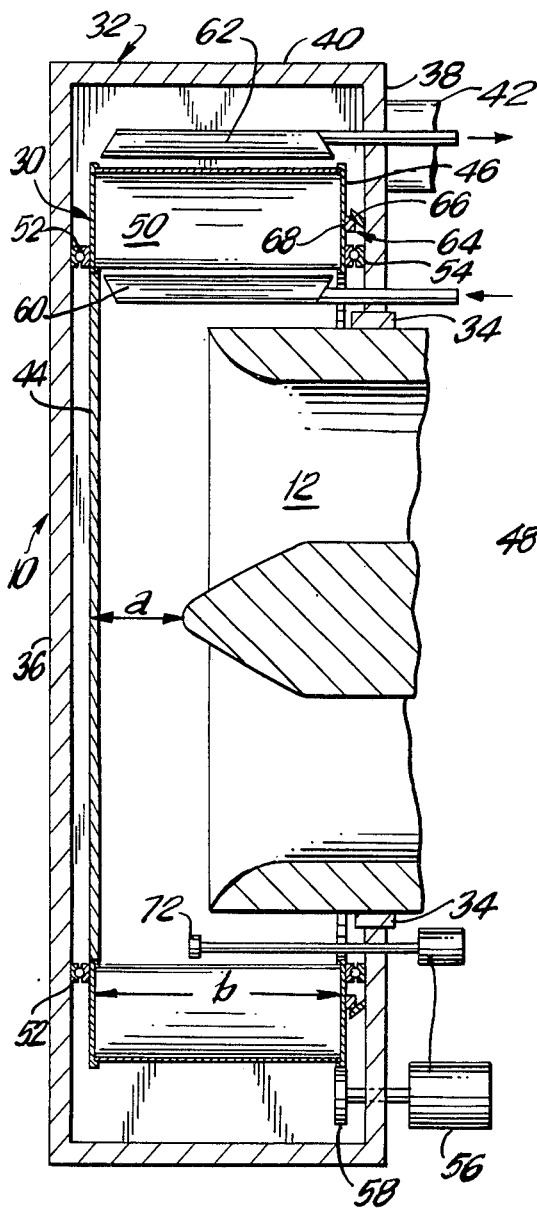
FIG. 2 is a cross sectional view of the inlet air filter mounted to a turbine engine.

The air inlet filter assembly 10 of the subject invention is illustrated in greater detail in FIG. 2. More particularly, the filter assembly 10 comprises a generally annular air filter 30 that is dimensioned to be generally concentrically disposed around the inlet end of the turbine engine 12. The annular air filter 30 is in at least partitial overlapping relationship with the inlet end of turbine engine 12. Consequently the annular air filter 30 adds little to the overall axial length of turbine engine 12. For example, the annular air filter 30 may extend axially approximately three inches beyond the end of the turbine engine 12, as indicated by dimension "a." The overal axial length of air filter 30 may be about 10 to 15 inches as indicated by dimension "b."

The annular air filter 30 is rotationally mounted within a plenum box 32 which, in turn, is fixedly mounted to the turbine engine 12. A stationary air tight seal 34 is disposed intermediate the plenum box 32 and the engine 12. The plenum box 32 includes an end wall 36, a mounting wall 38 and at least one outer wall 40 extending therebetween. The plenum box 32 can be generally rectangular, as illustrated in FIG. 1, or any other configuration in accordance with the available space in the vehicle. The plenum box 32 is in communication with at least one air inlet duct 42 through which the inlet air for the engine 12 is directed. Inlet duct 42 typically will be in communication with an inertial separator (not shown).

The annular air filter 30 includes a generally circular end plate 44 mounted to one axial end thereof. An annular end plate 46 is mounted to the axial end of the air filter 30 opposite the circular end plate 44. Together the circular and annular end plates 44 and 46 contribute to the structural support of the air filter 30 and ensure the desired directional flow of inlet air to the engine 12 as explained below.

Figure 3:
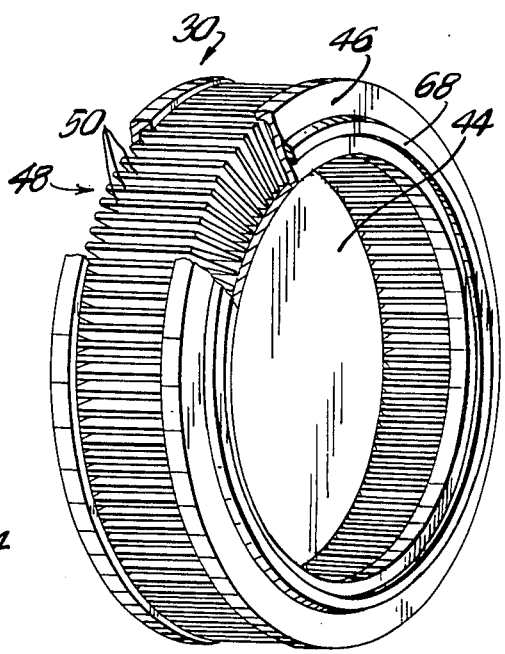
FIG. 3 is a perspective, partly in section, showing the circular air filter of the subject invention.
Figure 5:
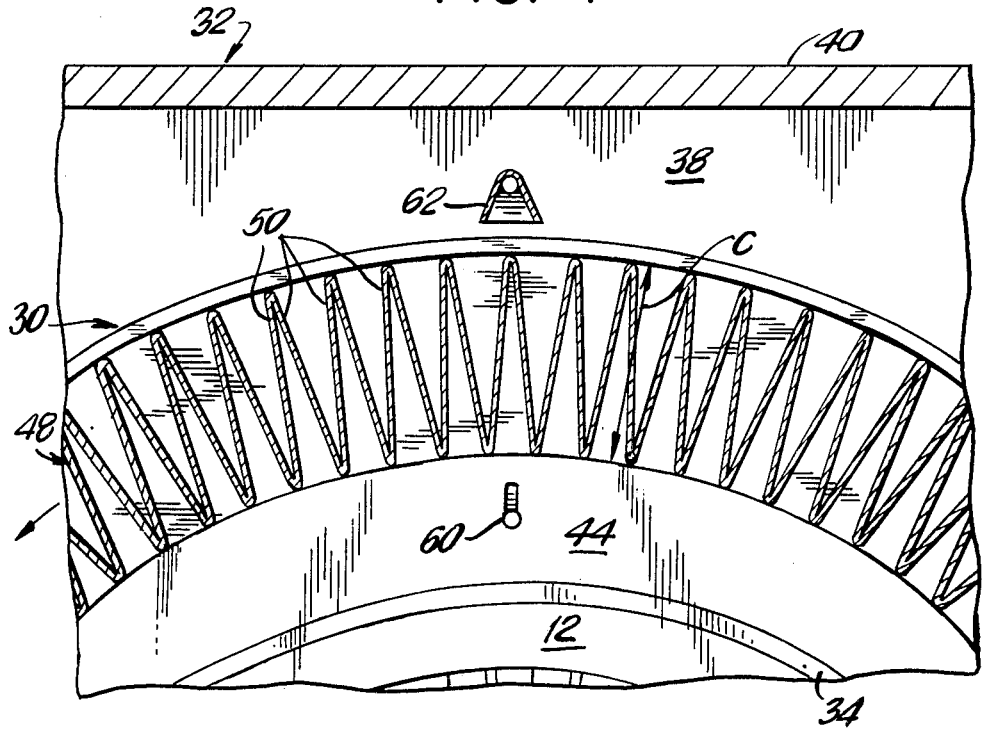
FIG. 5 is a cross sectional view taken along line 5—5 in FIG. 4.

As shown most clearly in FIGS. 3 and 5, the air filter 30 further comprises an array of pleated paper 48 disposed intermediate the circular and annular end plates 44 and 46. The paper 48 is pleated to form a large number of generally radially aligned planes 50 of filter paper. This construction enables a very large amount of filter surface area within a relatively small volume. Preferably, each pleat extends about 4 to 6 inches in a generally radial direction as indicated by dimension "c" in FIG. 5 and there are about 15 to 20 pleats per circumferential inch.

The air filter 30 is rotationally mounted in the plenum box 32. This rotationally mounting of air filter 30 is achieved by generally annular bearings 52 and 54. The bearings 52 and 54 support the air filter 30 relative to the plenum box 32 but permit relative rotational movement therebetween.

Rotation of the air filter is achieved by motor 56 which includes drive member 58 in communication with filter 30. The motor 56 can be electrically or pneumaticallay operated. Preferably, the motor 56 can be selectively started and stopped to rotate the air filter 30 only when needed, as explained herein. This selective operation results in increased efficiency and minimizes wear on the bearings 52 and 54.

The inlet air filter assembly 10 further includes an elongated air pressure nozzle 60 mounted adjacent to the inner circumferential surface of the air filter 30. More particularly, the air pressure nozzle 60 is in communication with a source of pressurized air and is mounted to direct the pressurized air in a generally radially outward direction relative to the annular air filter 30. The air pressure nozzle 60 is fixedly mounted relative to the plenum box 32.

A vacuum nozzle 62 is mounted in the plenum box 32 generally adjacent the outer circumferential surface of the circular air filter 30. More particularly, the vacuum nozzle 62 is disposed generally radially in line with the air pressure nozzle 60. The vacuum nozzle 62 is in communication with a vacuum source and is fixedly mounted relative to the plenum box 32.

Figure 4:
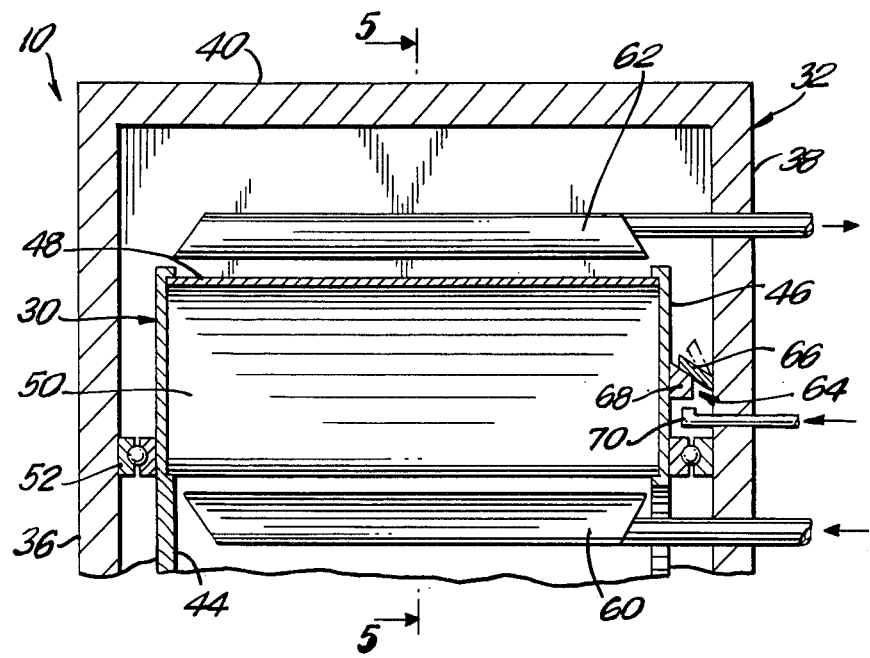
FIG. 4 is a cross sectional view of the air filter and cleaning mechanism of the subject invention.

The air inlet filter assembly 10 preferably includes an annular seal 64 disposed intermediate the annular end support 46 of the air filter 30 and the support wall 38 of the plenum box 32. The annular seal 64 as shown in FIG. 4, includes a generally rigid annular base 66 and a flexible annular flap 68 mounted adjacent one another. The base 66 is securely mounted to the annular end support 46 of air filter 30. The flexible annular flap 68, on the other hand, is mounted to the mounting wall 38 of plenum box 32. The opposite mounting arrangement, however, also is possible. The seal 64 is operative to ensure that the dust laden inlet air does not bypass the air filter 30. More particularly, the pressure differential that normally exist across the seal 64 ensures that the flexible annular flap 68 will be urged radially inwardly and into secure face to face contact with the rigid annular base 66.

An annular array of outwardly directed seal air pressure nozzles 70 is disposed radially inwardly from the annular seal 64. This array of seal air pressure nozzles 70 can be selectively operated to direct air outwardly adjacent seal 64, thereby causing the flexible annular flap 68 to be urged in a radially outward direction. Although this radially outward flow of air interrupts the seal 64, it substantially prevents an inward flow of dust particles. As will be explained further below, this radially outward flow of air can be selectively activated during the cleaning of the air filter 30 to ensure that local pressure differentials do not result in an inward movement of dust or debris toward the engine 12. Additionally the lifting of flap 66 prevents excessive wear on flap 66 during the rotation of filter 30.

The activation of the air pressure nozzles 60 and the vacuum 62 as well as the rotational movement of the air filter 30 preferably are initiated by a pressure sensor 72 which is in communication with the motor 56 and with the sources of pressurized air and vacuum. More particularly, the pressure sensor 72 is a pressure transducer that measures pressure within the area defined by the air filter 30 and is operative to send a signal to the motor 56 and the sources of air pressure and vacuum when the air pressure reaches a predetermind lever. In operation, as the air filter 30 becomes progressively more dirty, the volume of air flow through the filter 30 decreases while the velocity increases. This reduced volume and increased velocity of air causes a reduction of air pressure within the area defined by the air filter 30 and adjacent the inlet of turbine engine 12. When the air pressure is decreased to a predetermined level, the pressure sensor 72 signals motor 56 and the supplies of air pressure and vacuum to commence the cleaning of filter 30. This will be accomplished by simulanteously rotating air filter 30 while the air pressure nozzle 60 lifts dirt from the outer surface of the filter 30 and vacuum nozzle 62 carries the loosened dirt away. Furthermore air pressure through the array of seal nozzles 70 will lift the flap 66 from base 68 in annular seal 64 to facilitate rotation of filter 30 without wear on seal 64. This flow of air through seal nozzles 70 also prevents a radially inward movement of debris.

As an alternative to the above, the pressure sensor can be operative to detect the ratio of pressure across the air filter 30. This ratio will vary at different engine operating conditions as a function of the amount of debris retained on the filter 30. At a predetermined ratio, the pressure sensor 72 can activate the motor 56 and the sources of air pressure and vacuum.

In summary, a generally annular air filter is provided for mounting around the inlet end of a turbine engine. This mounting arrangement minimizes the space requirements for the air filter, and particularly reduces the axial length of the entire engine and the amount of ducting required. The circular air filter is rotationally mounted in a plenum box which is turn is securely mounted to the inlet end of the engine. Thus, the circular air filter is rotatable relative to both the plenum box and the engine. A stationary air pressure nozzle is mounted adjacent the inner circumferential surface of the air filter and is aligned to direct a flow of forced air radially outwardly against the air filter. A vacuum nozzle is disposed adjacent the external circumferential surface of the air filter and is stationarily mounted in that position generally radially in line with the air pressure nozzle. A motor also is mounted at least partly in the plenum box and in proximity to the air filter. The motor is operative to rotate the air filter. A pressure sensor also is mounted in the plenum box and is operative to activate the motor, the air pressure nozzle and the vacuum nozzle when pressure conditions across the filter become indicative of an accumulation of dirt or debris on the filter. Thus, the air filter will rotate and the air pressure and vacuum nozzles will remove dirt from the filter as the filter rotates relative thereto. An annular flexible seal is mounted between the air filter and the plenum box. The flexible seal is operative to prevent dirt or other debris from entering the engine. When the filter is being rotated for cleaning, air can be directed radially outwardly to simultaneously break the seal to facilitate the rotation and also to prevent inward movement of debris.

While the invention has been described relative to a prefered embodiment, it is obvious that various changes can be made without departing from the spirit of the invention as defined by the appended claims.

What is claimed is:

1. An air inlet filter assembly for filtering debris from air for a gas turbine engine, said gas turbine engine having an inlet end for receiving the filtered air, said air inlet filter assembly comprising:

a plenum box fixedly mounted to and surrounding the inlet end of the engine, said plenum box including an inlet for receiving debris laden air;

an annular air filter rotationally mounted within said plenum box intermediate the inlet of the plenum box and the inlet end of the engine, said annular air filter being operative to filter debris from air passed therethrough;

an air pressure nozzle fixedly mounted in said plenum box and adjacent the inner circumferential surface of said annular air filter, said air pressure nozzle being selectively operable to direct pressurized air generally radially outwardly and through said annular air filter to loosen debris thereon;

a suction nozzle fixedly mounted within said plenum box and adjacent the outer circumferential surface of said annular air filter and generally radially opposite the air pressure nozzle, said suction nozzle being selectively operable to remove the loosened debris from the annular air filter;

driving means for selectively rotating said annular air filter about its central axis and relative to the plenum box, the air pressure nozzle and the suction nozzle such that the entire annular air filter passes between the air pressure and suction nozzles with each rotation, whereby simultaneous operation of said air pressure nozzle, said suction nozzle and said driving means enables the entire annular air filter to be cleaned with each rotation of said annular air filter;

at least one flexible seal mounted intermediate said air filter and said plenum box, said flexible seal being operative to prevent debris from bypassing the air filter and entering the engine, is generally annular in configuration and is biased in radially inward direction to prevent the inward movement of debris toward the turbine engine and is fixedly mounted to the plenum box and is biased against the annular air filter; and an array of seal air pressure nozzles disposed generally adjacent and radially inwardly from said flexible seal, said array of seal air pressure nozzles being selectively operable to direct air radially outward against said flexible seal to facilitate rotation of said air filter and to prevent movement of debris past the seal.

2. An assembly as in claim 1 wherein the engine includes a rotational axis, and wherein the central axis of the annular air filter is parallel to the rotational axis of the engine.

3. An assembly as in claim 1 wherein the filter is concentrically mounted relative to the engine.

4. An assembly as in claim 1 wherein the driving means is an electric motor.

5. An assembly as in claim 1 wherein the driving means is a pneumatic motor.

6. An assembly as in claim 1 wherein the filter is rotationally mounted within the plenum box by a plurality of annular bearings.

7. An assembly as in claim 1 further including a pressure sensor mounted within said plenum box, said pressure sensor being in communication with the driving means and with the air pressure and suction nozzles, whereby said pressure sensor is operative is detect pressure conditions which require the air filter to be cleaned.

8. An assembly as in claim 1 wherein said annular air filter includes a circular support adjacent one axial end thereof, said circular support having a diameter substantially equal to the outer diameter of the annular air filter.

9. An assembly as in claim 8 further including an annular support mounted to the axial end of said annular air filter opposite the circular support.

10. An air filter assembly for filtering debris from air for a gas turbine engine, said engine having an inlet end for receiving the filtered air, said air filter assembly comprising:

a plenum box fixedly mounted to and surrounding the inlet end of the engine, said plenum box including an inlet for receiving debris laden air;

an annular air filter rotationally mounted in said plenum box, intermediate the inlet of the plenum box and the inlet end of the engine, said annular air filter generally concentrically surrounding the inlet end of the engine;

an air pressure nozzle fixedly mounted in said plenum box and adjacent the inner circumferential surface of the air filter, said air pressure nozzle being selectively operable to direct air generally radially outwardly and through said air filter to loosen debris thereon;

a suction nozzle fixedly mounted in the plenum box and adjacent the outer circumferential surface of said air filter, said suction nozzle being selectively operable to remove the loosened debris from the outer circumferential surface of the annular air filter;

a generally annular flexible seal fixedly mounted to said plenum box and biased against the annular air filter;

an array of seal air pressure nozzles disposed radially inwardly from said flexible seal and being selectively operable to direct pressurized air outwardly to urge the flexible seal away from the air filter;

driving means mounted adjacent said annular air filter and being selectively operable for rotating said annular air filter about its central axis and relative to the plenum box, the air pressure nozzle and the suction nozzle such that the annular air filter rotationally moves between the air pressure and suction nozzles; and a pressure sensor means mounted adjacent the inlet end of the engine for sensing air pressure, said pressure sensing means being in communication with said driving means, said air pressure nozzle, said suction nozzle and said array of seal air pressure nozzles such that at a predetermined pressure level as sensed by said pressure sensing means, the array of seal air pressure nozzles urge the flexible seal away the air filter, the driving means rotates the air filter and the air pressure nozzle and suction nozzle cooperate with one another to remove debris from the air filter.

11. An air inlet filter assembly for filtering debris from air for a gas turbine engine, said gas turbine engine having an inlet end for receiving the filtered air, said air inlet filter assembly comprising:

a plenum box fixedly mounted to and surrounding the inlet end of the engine, said plenum box including an inlet for receiving debris laden air;

an annular air filter rotationally mounted within said plenum box intermediate the inlet of the plenum box and the inlet end of the engine, said annular air filter being operative to filter debris from air passed therethrough;

an air pressure nozzle fixedly mounted in said plenum box and adjacent the inner circumferential surface of said annular air filter, said air pressure nozzle being selectively operable to direct pressurized air generally radially outwardly and through said annular air filter to loosen debris thereon;

a suction nozzle fixedly mounted within said plenum box and adjacent the outer cirumferential surface of said annular air filter and generally radially opposite the air pressure nozzle, said suction nozzle being selectively operable to remove the loosened debris from the annular air filter;

at least one flexible seal mounted intermediate said air filter and said plenum box, said flexible seal being operative to prevent debris from bypassing the air filter and entering the engine;

an array of seal air pressure nozzles disposed generally adjacent and radially inwardly from said flexible seal, said array of seal air pressure nozzles being selectively operable to direct air radially outward against said flexible seal to facilitate rotation of said air filter and to prevent movement of debris past the seal; and driving means for selectively rotating said annular air filter about its central axis and relative to the plenum box, the air pressure nozzle and the suction nozzle such that the entire annular air filter passes between the air pressure and suction nozzles with each rotation, whereby simultaneous operation of said air pressure nozzle, said suction nozzle and said driving means enables the entire annular air filter to be cleaned with each rotation of said annular air filter.

* * * * *